(12) United States Patent
Lee et al.

(10) Patent No.: US 11,117,201 B2
(45) Date of Patent: Sep. 14, 2021

(54) SINGLE-SIDED HIGH FEED CUTTING INSERT AND CUTTING TOOL EQUIPPED WITH SAME

(71) Applicant: KORLOY INC., Seoul (KR)

(72) Inventors: Sang Yong Lee, Cheongju-si (KR);
Young Nam Choi, Cheongju-si (KR);
Jae Man Park, Cheongju-si (KR)

(73) Assignee: KORLOY INC., Seoul (KR)

(*) Notice: Subject to any disclaimer, the term of this patent is extended or adjusted under 35 U.S.C. 154(b) by 208 days.

(21) Appl. No.: 16/478,516

(22) PCT Filed: Dec. 15, 2017

(86) PCT No.: PCT/KR2017/014780
§ 371 (c)(1),
(2) Date: Jul. 17, 2019

(87) PCT Pub. No.: WO2018/182138
PCT Pub. Date: Oct. 4, 2018

(65) Prior Publication Data
US 2019/0388981 A1    Dec. 26, 2019

(30) Foreign Application Priority Data

Mar. 30, 2017   (KR) ......................... 10-2017-0041024

(51) Int. Cl.
*B23C 5/20*      (2006.01)
(52) U.S. Cl.
CPC ........ *B23C 5/20* (2013.01); *B23C 2200/0455* (2013.01)

(58) Field of Classification Search
CPC .... B23C 2200/0455; B23C 2200/0494; B23C 2200/203; B23C 2200/367;
(Continued)

(56) References Cited

U.S. PATENT DOCUMENTS 4,124,326 A * 11/1978  Cost ...................... B23B 27/141
                                                    407/114
5,116,167 A    5/1992  Niebauer
(Continued)

FOREIGN PATENT DOCUMENTS

CN       101878083 A    11/2010
EP        2214857 B1    10/2011
(Continued)

*Primary Examiner* — Nicole N Ramos
(74) *Attorney, Agent, or Firm* — Rabin & Berdo, P.C.

(57) ABSTRACT

The technical problem to be solved by the present disclosure is to provide a single-sided high feed cutting insert which can have increased edge strength and reduced cutting load so as to be suitable for high feed machining. To this end, the single-sided high feed cutting insert of the present disclosure comprises: a short cutting edge disposed between a major surface and a short lateral surface; a long cutting edge disposed between the major surface and a long lateral surface; and a corner cutting edge disposed between the short cutting edge and the long cutting edge, wherein the short cutting edge has an outwardly convex curved shape when viewed from the major surface, and a minor surface has a straight shape when viewed from the short and long lateral surfaces, respectively.

14 Claims, 9 Drawing Sheets

(58) Field of Classification Search
CPC ...... B23C 2210/0442; B23C 2210/168; B23C 5/06; B23C 5/20; B23C 5/207
See application file for complete search history.

(56) References Cited

U.S. PATENT DOCUMENTS

| | | | | |
|---|---|---|---|---|
| 5,639,189 | A * | 6/1997 | Hoefler | B23C 3/04 407/113 |
| 7,008,146 | B2 * | 3/2006 | DeRoche | B23C 5/109 407/114 |
| 8,202,026 | B2 * | 6/2012 | Satran | B23C 5/207 407/113 |
| 8,696,257 | B2 * | 4/2014 | Saito | B23C 5/2213 407/42 |
| 8,702,353 | B2 | 4/2014 | Chen et al. | |
| 9,044,813 | B2 * | 6/2015 | Choi | B23C 5/202 |
| 2005/0063792 | A1 * | 3/2005 | Satran | B23C 5/1072 407/113 |
| 2005/0169716 | A1 * | 8/2005 | Smilovici | B23C 5/2221 407/113 |
| 2005/0214081 | A1 * | 9/2005 | Satran | B23C 5/06 407/113 |
| 2007/0104546 | A1 * | 5/2007 | Maeta | B23C 5/202 407/113 |
| 2009/0136304 | A1 * | 5/2009 | Satran | B23C 5/207 407/104 |
| 2011/0129309 | A1 * | 6/2011 | Kovac | B23C 5/06 407/42 |
| 2014/0161544 | A1 * | 6/2014 | Morandeau, Sr. | B23C 5/006 407/40 |
| 2017/0014920 | A1 * | 1/2017 | Fang | B23C 5/2221 |
| 2017/0157684 | A1 * | 6/2017 | Nam | B23C 5/20 |
| 2017/0297120 | A1 * | 10/2017 | Fang | B23C 5/2221 |
| 2018/0333791 | A1 * | 11/2018 | Lee | B23C 5/207 |

FOREIGN PATENT DOCUMENTS

| | | | |
|---|---|---|---|
| EP | 1711296 B1 | 5/2013 | |
| JP | 2014-503375 A | 2/2014 | |
| KR | 10-1996-0000555 B1 | 1/1996 | |
| KR | 10-2005-0115643 A | 12/2005 | |
| KR | 10-0657382 B1 | 12/2006 | |
| KR | 10-2014-0108192 A | 9/2014 | |
| WO | 2012-104832 A1 | 8/2012 | |
| WO | WO-2016006812 A1 * | 1/2016 | ............ B23C 5/207 |

* cited by examiner

SINGLE-SIDED HIGH FEED CUTTING INSERT AND CUTTING TOOL EQUIPPED WITH SAME

TECHNICAL FIELD

The present disclosure relates to a single-sided cutting insert having a high feed rate and a cutting tool equipped with the same.

BACKGROUND ART

Generally, a cutting insert is fastened to a cutting tool mounted on a machine tool and is used for cutting a workpiece made of iron, non-ferrous metal, non-metal material, and so on.

FIG. 8 is a perspective view of a conventional tangential cutting insert, and FIG. 9 is a perspective view of another conventional double-sided cutting insert.

An example of the conventional technology is a tangential cutting insert 10 disclosed in EP02214857 A1, which includes, as shown in FIG. 8, an upper surface 12, a lower surface 14, two lateral surfaces 24 that connect between the upper surface and the lower surface, a front surface 20 that connects between the two lateral surfaces, a main cutting edge 32 formed between the front surface 20 and the upper surface 12, an auxiliary cutting edge 34 formed between the front surface 20 and the lateral surface 24, a fastening hole 18 into which a cutting tool fastening bolt (not shown) extending through the upper surface 12 and the lower surface 14 is inserted. In this example, the main cutting edge 32 has two sloping straight lines extending from a center to form an approximately V shape when viewed from the upper surface 12, and the auxiliary cutting edge 34 has a shape of a straight line when viewed from the lateral surface 24, and there is a corner cutting edge 36 placed between the main cutting edge 32 and the auxiliary cutting edge 34.

Another example of the conventional technology is a double-sided cutting insert 10 disclosed in EP01711296 A1, which includes, as shown in FIG. 9, two short lateral surfaces 12 that face each other in opposite directions, two major lateral surfaces 18 and two auxiliary lateral surfaces 16 that connect between the two end surfaces, four main cutting edges 34 that connects each of the end surfaces 12 and each of the major lateral surfaces 18, four minor cutting edge 36 that connects each of the end surfaces 12 and each of the minor lateral surfaces 16, a fastening hole 22 into which a cutting tool fastening bolt (not shown) extending through the two major lateral surfaces is inserted. In this example, the main cutting edge 34 has a shape of a straight line inclined to one side when viewed from the major lateral surface 18, and the minor cutting edge 36 has a shape of a straight line inclined to one side when viewed from the minor lateral surface 16, and there is a corner cutting edge 40 placed between the main cutting edge 34 and the minor cutting edge 36.

However, the conventional technologies like those described above have a drawback that, since the main cutting edge and the auxiliary cutting edge have a straight shape, the edge strength is decreased, and they cannot be used for high feed rate cutting due to considerable contact load with the workpiece.

Further, the conventional techniques are double-sided cutting inserts using both front surfaces (or two end faces), in which one of the front surfaces (or end surfaces) is used for cutting, while the other front surface (or end surface) is in contact with and fastened to the seat surface of the cutting tool, and accordingly, the front surface (or the end surface) cannot be formed as a flat surface due to the presence of the main cutting edge and the auxiliary cutting edge, resulting in a problem that the contact area with a seat surface of the cutting tool is reduced and the fastening stability is deteriorated.

Technical Problem

The technical objective of the present disclosure is to provide a single-sided high feed cutting insert having a high feed rate capable of increasing the edge strength and reducing the cutting load so as to be suitable for high feed rate cutting, and a cutting tool equipped with the same.

Another objective of the present disclosure is to provide a single-sided high feed cutting insert capable of improving a fastening stability with the cutting tool, and a cutting tool equipped with the same.

Technical Solution

According to an aspect of the present disclosure, there is provided a single-sided high feed cutting insert including a major surface and a minor surface facing each other in opposite directions, two short lateral surfaces which connect between the major surface and the minor surface and which face each other in opposite directions, two long lateral surfaces which connect between the major surface and the minor surface and between the two short lateral surfaces, which face each other in opposite directions and which have a width greater than that of the short lateral surfaces, a fastening hole extending through the two long lateral surfaces to receive a cutting tool fastening bolt inserted therein, short cutting edges provided on boundary portions between the major surface and the short lateral surfaces, long cutting edges provided on boundary portions between the major surface and the long lateral surfaces, corner cutting edges that connect between the short cutting edges and the long cutting edges, in which the short cutting edges may each have an outwardly convex curved shape when viewed from the major surface, and the minor surface may have a straight shape when viewed from the short and long lateral surfaces, respectively.

The short cutting edges may each have an outwardly convex curved shape when viewed from the short lateral surfaces.

The long cutting edges may each include first and second concave sections that are inwardly concave, when viewed from the long lateral surfaces, and a straight line section that connects the first and second concave sections.

When viewed from the long lateral surfaces, each of the first and second concave sections may start from the corner cutting edge and end at the straight line section.

Each of the corner cutting edges may be connected to the short cutting edges in a concave shape continuously from the first and second concave sections, respectively, when viewed from the long lateral surfaces.

The corner cutting edges may each be curved with the same radius of curvature as the first and second concave sections.

The long cutting edges may each have a symmetrical shape with respect to a center of the straight line section.

The straight line section may protrude outwardly relative to the first and second concave sections.

In one example, the short lateral surfaces may each include a first clearance surface adjacent to the short cutting edge, and the first clearance surface may form an obtuse angle with respect to the major surface.

In addition, the short lateral surfaces may each also include a second clearance surface connecting the first clearance surface and the minor surface, in which the second clearance surface may form a right angle with respect to the major surface and the minor surface, respectively, and may have a generally flat shape.

In addition, the first clearance surface may have a shape in which a width in a direction from the major surface to the minor surface increases gradually from a center toward the respective long lateral surfaces.

As another example, the short lateral surfaces may each include a first clearance surface adjacent to the short cutting edge, and a second clearance surface connecting the first clearance surface and the minor surface, in which the first clearance surface may form a right angle with respect to the major surface, and in which the second clearance surface may form an acute angle with respect to the major surface and an obtuse angle with respect to the minor surface, and may have a generally flat shape.

Each of the major surface may be horizontally symmetrical, vertically symmetrical, and rotationally symmetrical by 180 degrees with respect to a center thereof.

When viewed from the major surface, centers of the short cutting edges may protrude further than the rest portion.

When viewed from the short lateral surfaces, centers of the short cutting edges may protrude further than the rest portion.

Meanwhile, a cutting tool according to an embodiment of the present disclosure is a type of cutting tool that is equipped with the single-sided high feed cutting insert having a high feed rate according to the embodiment of the present disclosure described above, in which the cutting tool may include a first seat surface on which the minor surface is placed, a second seat surface on which the short lateral surfaces are placed, and a third seat surface on which the long lateral surfaces are placed, in which the third seat surface may be inclined gradually away from a center of the cutting tool in a direction toward the bottom surface of the cutting tool.

Advantageous Effects

As described above, the single-sided high feed cutting insert having a high feed rate and the cutting tool equipped with the same according to an embodiment of the present disclosure have the following effects.

According to an embodiment of the present disclosure, a technical configuration is provided, which includes a short cutting edge, a long cutting edge, and a corner cutting edge, in which the short cutting edge has an outwardly convex curved shape when viewed from the major surface. Accordingly, the curved shape can increase the edge strength of the short cutting edge, and reduce the contact resistance with the workpiece and accordingly reduce the contact load, and thus can be suitable for high feed rate cutting.

Further, according to the embodiment of the present disclosure, since the minor surface has a straight shape when viewed from the short and long lateral surfaces, respectively, the minor surface is formed generally as a flat surface so that the contact area with a first seat surface of the cutting tool can be increased to improve the fastening stability.

BEST MODE

Hereinafter, preferred embodiments of the present disclosure will be described in detail with reference to the accompanying drawings. However, the description proposed herein is just a preferable example for the purpose of illustrations only, and not intended to limit the scope of the disclosure, so it should be understood that other equivalents and modifications could be made thereto without departing from the scope of the disclosure.

Figure 1:
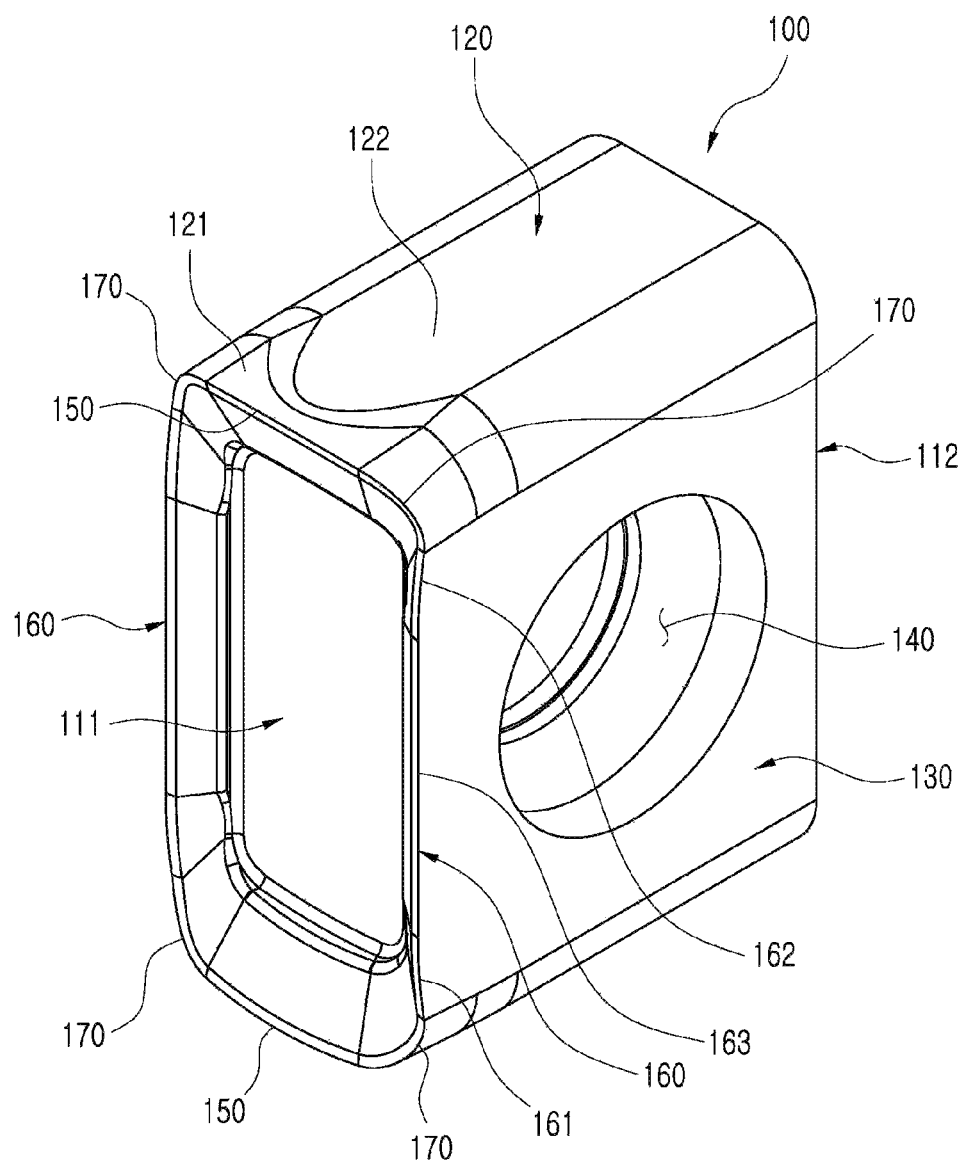
FIG. 1 is a perspective view schematically showing a single-sided high feed cutting insert according to an embodiment of the present disclosure.
Figure 2:
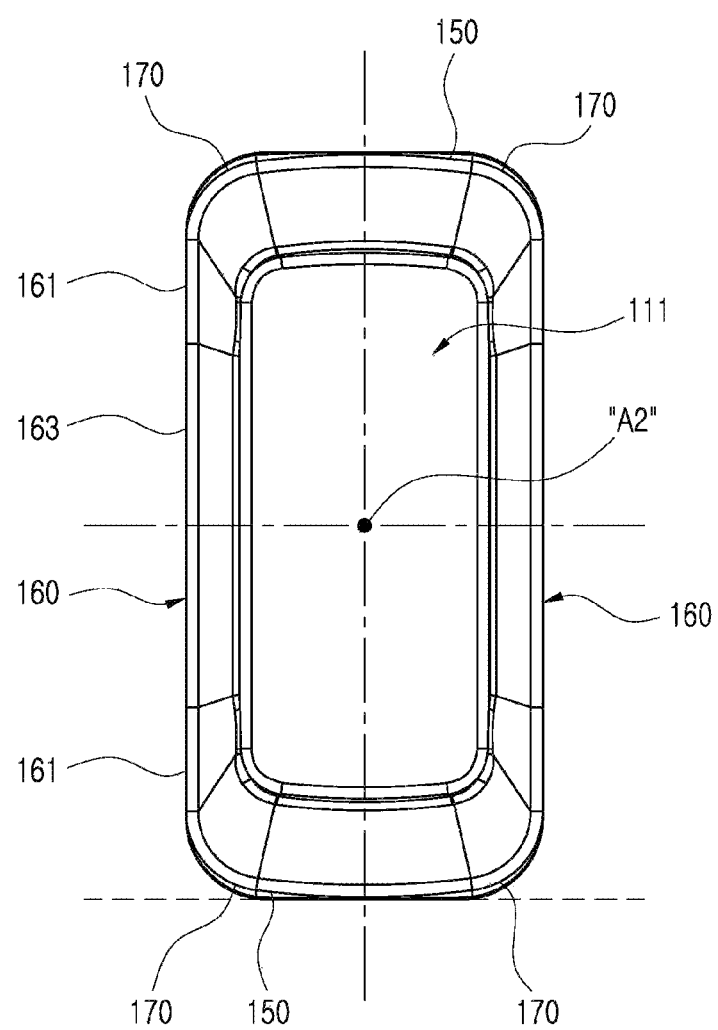
FIG. 2 is a view of the single-sided high feed cutting insert of FIG. 1 viewed from a major surface.

FIG. 1 is a perspective view schematically showing a single-sided high feed cutting insert according to an embodiment of the present disclosure, and FIG. 2 is a view of the single-sided high feed cutting insert of FIG. 1 viewed from a major surface.

Figure 3:
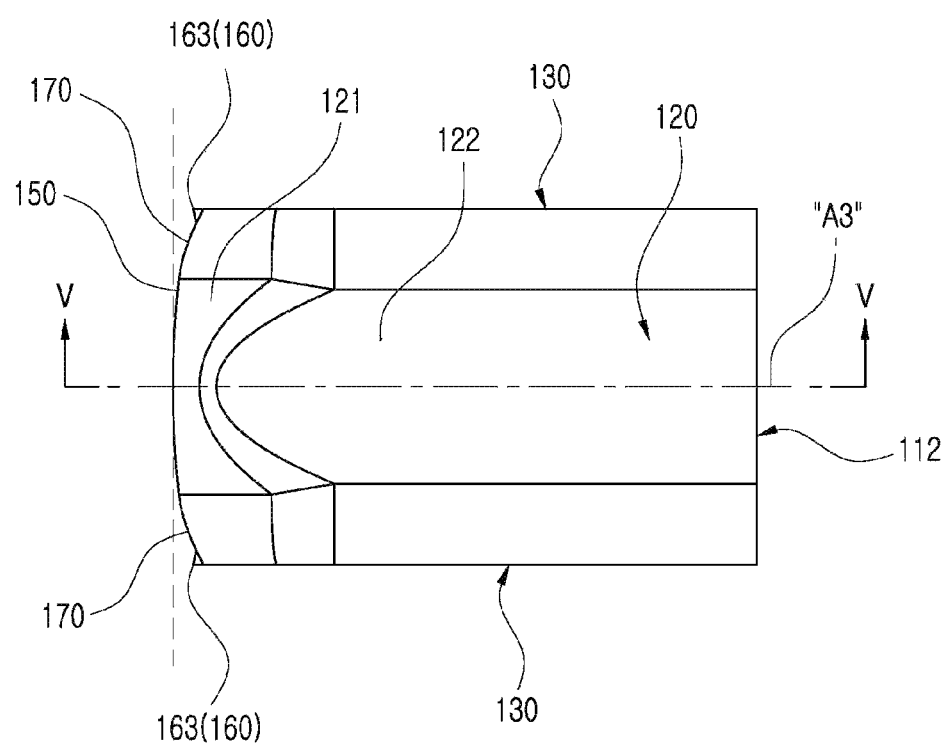
FIG. 3 is a view of the single-sided high feed cutting insert of FIG. 1 viewed from a short lateral surface.
Figure 4:
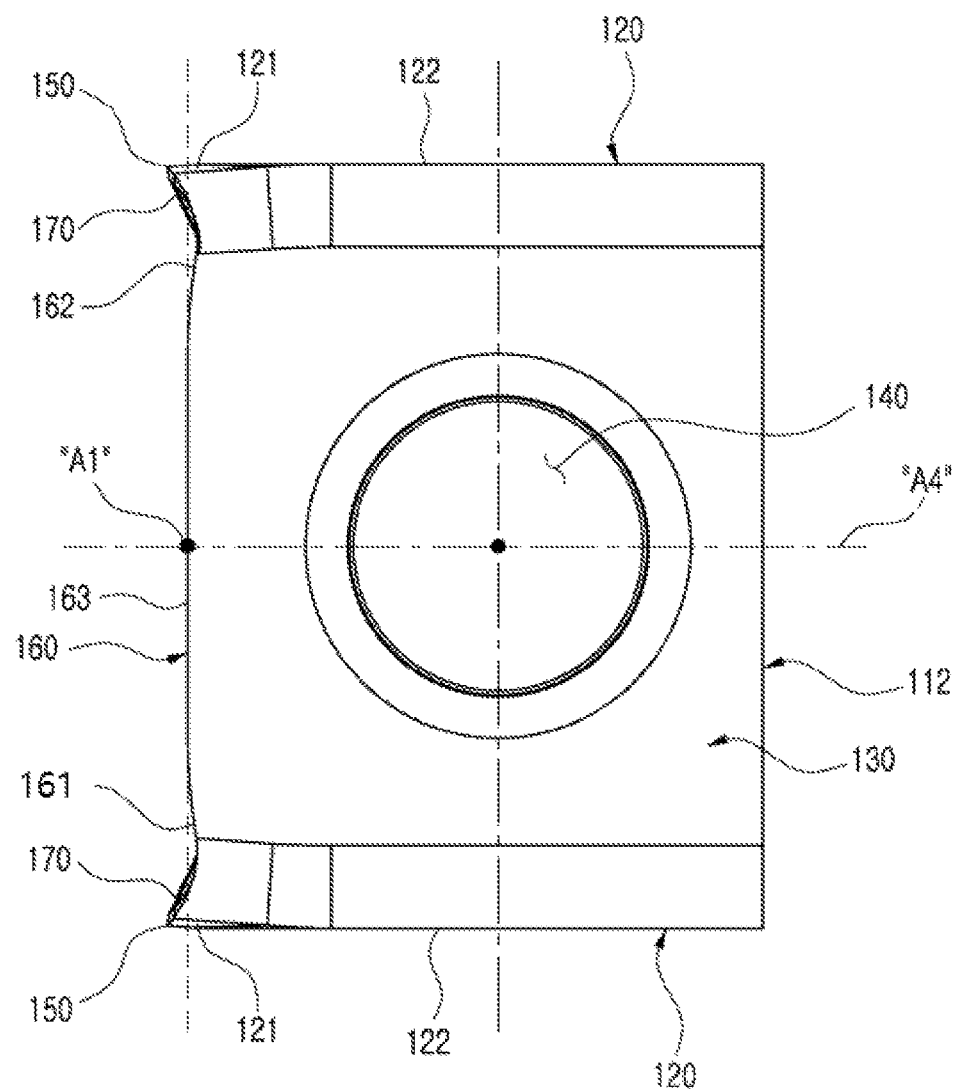
FIG. 4 is a view of the single-sided high feed cutting insert of FIG. 1 viewed from a long lateral surface.
Figure 5:
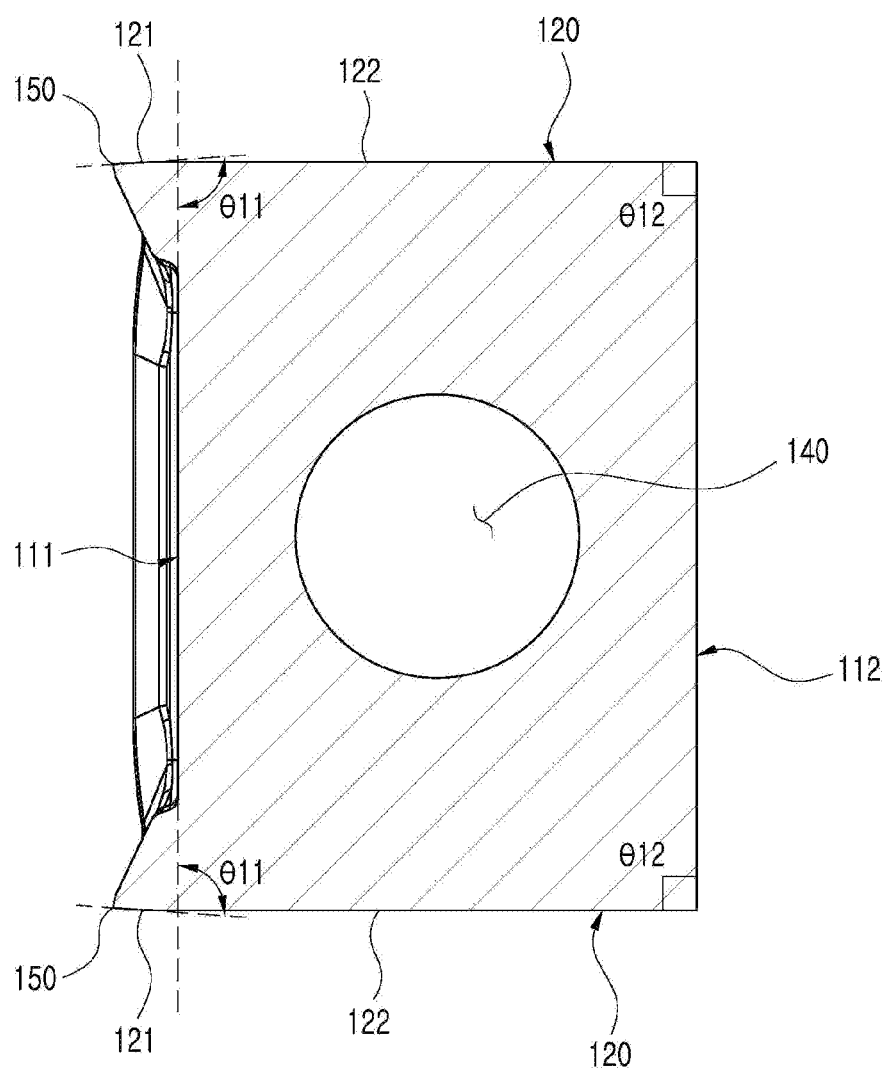
FIG. 5 is a cross-sectional view of the single-sided high feed cutting insert of FIG. 3 cut along a V-V line.

FIG. 3 is a view of the single-sided high feed cutting insert of FIG. 1 viewed from a short lateral surface, FIG. 4 is a view of the single-sided high feed cutting insert of FIG. 1 viewed from a long lateral surface, and FIG. 5 is a cross-sectional view of the single-sided high feed cutting insert of FIG. 3 cut along a V-V line.

As shown in FIGS. 1 to 5, a single-sided high feed cutting insert 100 having a high feed rate according to an embodiment of the present disclosure includes a major surface (upper surface) 111, a minor surface (lower surface) 112, two short lateral surfaces (major lateral surfaces) 120, two long lateral surfaces (minor lateral surfaces) 130, a fastening hole 140, a short cutting edge (major cutting edge) 150, a long cutting edge (outer major cutting edge) 160, and a corner cutting edge 170. Hereinafter, each of the components will be described in detail with continued reference to FIGS. 1 to 5.

As shown in FIGS. 1 to 4, the major surface 111 and the minor surface 112 face each other in opposite directions. The two short lateral surfaces 120 connect between the major surface 111 and the minor surface 112 and face each other in opposite directions. The two long lateral surfaces 130 connect between the major surface 111 and the minor surface 112 and between the two short lateral surfaces 120, face each other in opposite directions, and have a greater width than the short lateral surfaces 120. In addition, as shown in FIGS. 1 and 4, the fastening hole 140 extends through the two long lateral surfaces 130 such that the cutting tool fastening bolt 10 (see FIG. 6) is inserted therein.

Further, the major surface 111 may be horizontally symmetrical, vertically symmetrical, and rotationally symmetrical by 180 degrees with respect to a center A2 thereof, as shown in FIG. 2. As shown in FIGS. 3 and 4, the minor surface 112 has a straight shape when viewed from the short and long lateral surfaces 120, 130 respectively, and thus the minor surface 112 is formed generally as a flat surface such that a contact area with a first seat surface 201 of a cutting tool (200 in FIG. 6) may be increased to improve the fastening stability. As shown in FIG. 3, each of the short lateral surfaces 120 may be vertically symmetrical, in the drawing, with respect to the center line A3. As shown in FIG. 4, each of the long lateral surfaces 130 may be vertically symmetrical, in the drawing, with respect to the center line A4. Thus, it is possible to use with not only a right-handed type cutting tool that is rotated rightward (clockwise when viewed downward from the top of the cutting tool) for cutting, but also a left-handed type cutting tool that is rotated leftward (counterclockwise when viewed downward from the top of the cutting tool) for cutting, and when used with both left-handed and right-handed type cutting tools, the four corners of the single-sided high feed cutting insert 100 of the present disclosure may be used in turn.

As shown in FIGS. 1 to 4, short cutting edges (major cutting edges) 150 are provided on boundary portions between the major surface 111 and the short lateral surfaces 120 to substantially cut the workpiece in contact therewith, long cutting edges 160 are provided on boundary portions between the major surface 111 and the long lateral surfaces 130 to substantially cut the workpiece in contact therewith, and corner cutting edges 170 connect between each of the short cutting edges 150 and each of the long cutting edges 160 to substantially cut the workpiece in contact therewith. The single-sided high feed cutting insert 100 according to an embodiment of the present disclosure described above includes two short cutting edges 150, two long cutting edges 160, and four corner cutting edges 170.

Hereinafter, referring to FIGS. 1 to 4 again, the short cutting edge 150 will be described in more detail.

The short cutting edge 150 has an outwardly convex curved shape when viewed from the major surface 111, as shown in FIG. 2. Therefore, this curved convex shape can allow increased edge strength of the short cutting edge 150 and reduced contact resistance with the workpiece, thus resulting in reduced cutting load, and accordingly, the single-sided high feed cutting insert 100 provided with the short cutting edge 150 in the shape described above according to the present disclosure can be ultimately used for high feed rate cutting. In addition, as shown in FIG. 2, when viewed from the major surface 111, the center of the short cutting edge 150 may protrude further than the rest portion, and have a horizontally symmetrical structure about the protruding portion such that the cutting insert may be used for both the left-handed type cutting tool (not shown) and the right-handed type cutting tool 200 (see FIG. 6).

In addition, the short cutting edge 150 may also have an outwardly convex curved shape when viewed from the short lateral surface 120, as shown in FIG. 3. Thus, the short cutting edge 150 forms an obtuse angle with respect to the long cutting edge 160 when viewed from the major surface 111 as shown in FIG. 2, and forms an obtuse angle with respect to the long lateral surface 130 when viewed from the short lateral surface 120 as shown in FIG. 3, such that the short cutting edge 150 has a substantially helix cutting edge structure, and this can further increase the edge strength of the short cutting edge 150 and further reduce the cutting load of the short cutting edge 150.

Figure 6:
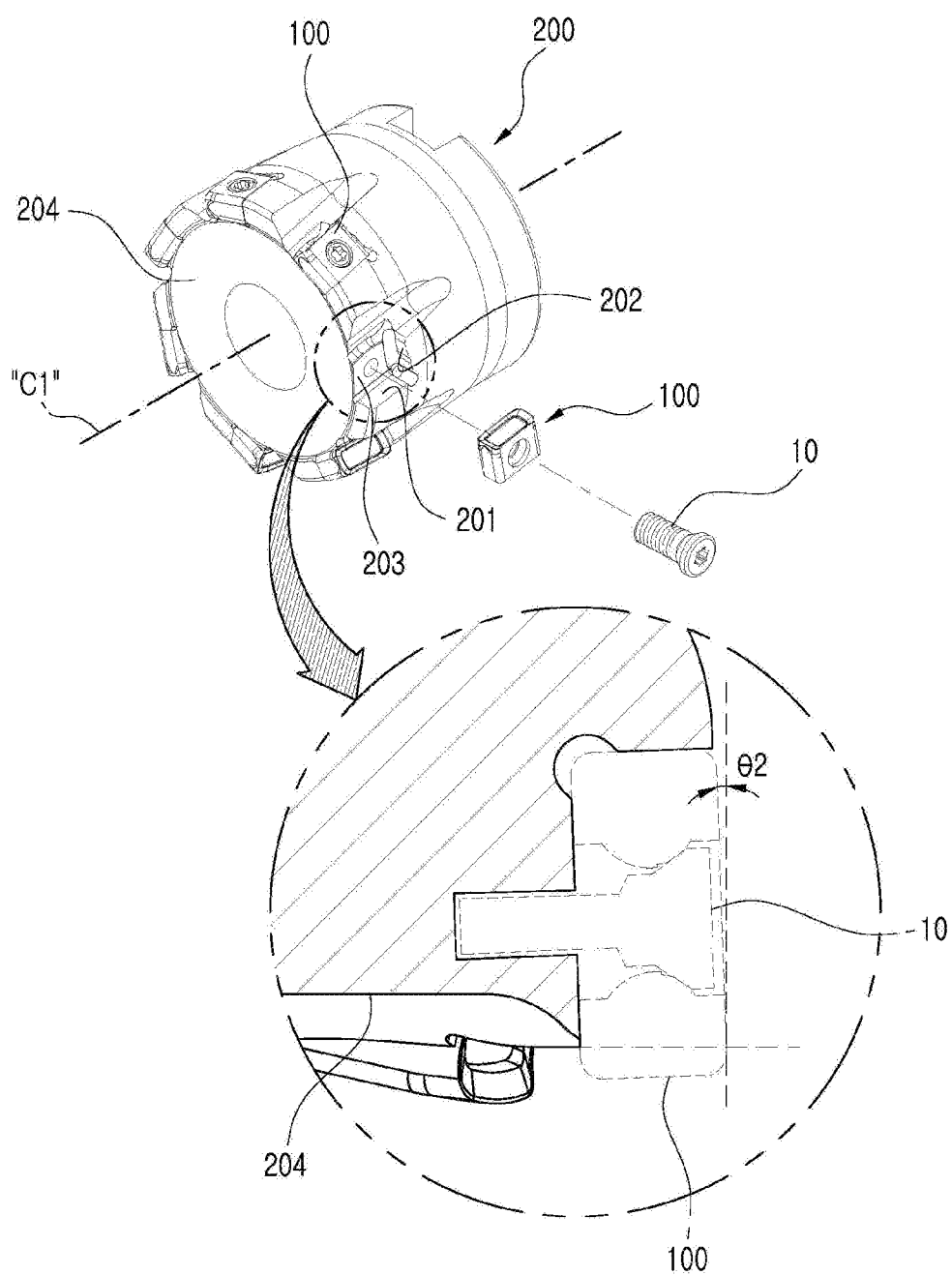
FIG. 6 is a perspective view schematically showing a cutting tool equipped with the single-sided high feed cutting insert of FIG. 1.

Further, as shown in FIG. 3, when viewed from the short lateral surface 120, the center of the short cutting edge 150 may also protrude further than the rest portion, and the short cutting edge 150 may have a vertically symmetrical structure in the drawing about the protruding portion such that the cutting insert can be used for both left-handed type cutting tool (not shown) and right-handed type cutting tool 200 (see FIG. 6).

Hereinafter, referring to FIGS. 1 to 4 again, the long cutting edge 160 will be described in more detail.

As shown in FIGS. 1 and 4, the long cutting edge 160 may include a first concave section (a first outer main cutting edge) 161 and a second concave section (a third outer main cutting edge) 162, which are inwardly concave when viewed from the long lateral surface 130, and a straight line section (a second outer main cutting edge) 163 that connects between the first and second concave sections 161 and 162. Thus, the edge strength of the long cutting edge 160 can be enhanced through the first and second concave sections 161 and 162, and the cutting load of the long cutting edge 160 can be reduced through the first and second concave sections 161 and 162, which results in reduced cutting resistance with the workpiece during a pocket cutting for processing grooves and so on. In addition, although not shown, when the cutting insert 100 of the present disclosure is mounted on a cutting tool (see 200 in FIG. 6), since the cutting insert 100 according to the present disclosure may be realized in a positively inclined form with respect to an axis (see C1 in FIG. 6) of the cutting tool (see 200 in FIG. 6) through the first or second concave section 161 or 162, it is possible to prevent the interferences with the side wall of the workpiece during step cutting and also reduce the cutting resistance when the cutting insert is in contact with the workpiece.

Further, as shown in FIGS. 1 and 4, each of the first and second concave sections 161 and 162 may start from the corner cutting edge 170 and end at the straight line section 163, when viewed from the long lateral surface 130. In addition, as shown in FIG. 4, the long cutting edge 160 may have a vertically symmetrical shape with respect to the center of the straight line section such that the cutting insert can be used for both left-handed type cutting tool (not shown) and right-handed type cutting tool 200 (see FIG. 6).

Figure 8:
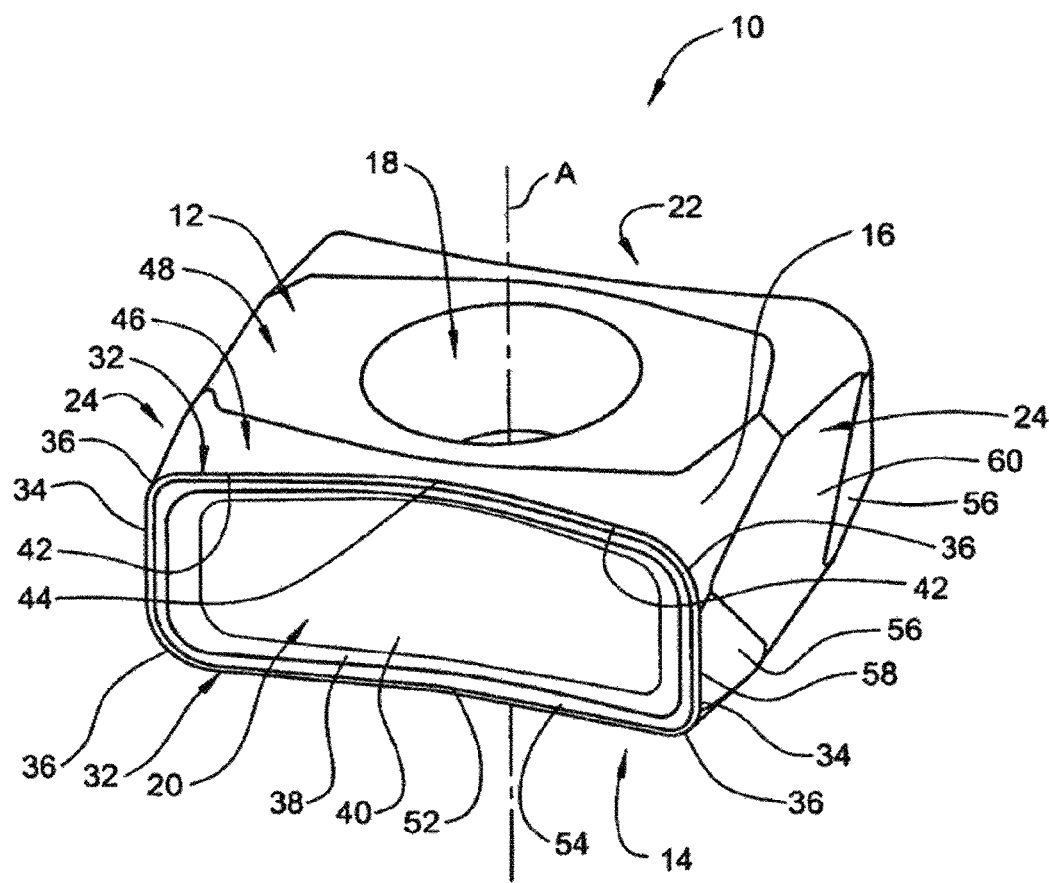
FIG. 8 is a perspective view showing a conventional tangential cutting insert.
Figure 9:
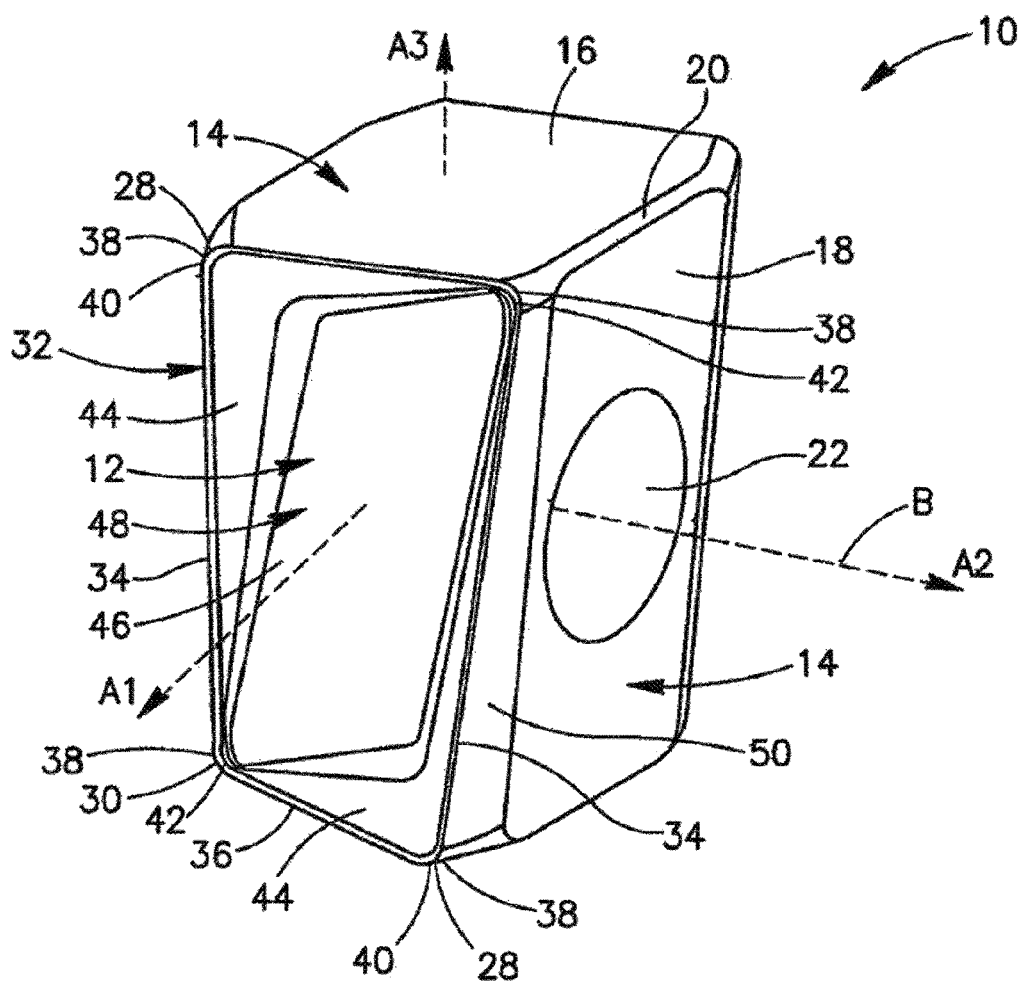
FIG. 9 is a perspective view showing another conventional double-sided cutting insert.

In addition, the straight line section 163 may relatively outwardly protrude with respect to the first and second concave sections 161 and 162, as shown in FIGS. 1 and 4. Accordingly, since the long lateral surface 130 is widened as much as the protruded straight line section 163, when the cutting insert is fastened with the cutting tool 200 (see FIG. 6), the contact area with a third seat surface 203 (see FIG. 6) of the cutting tool 200 (see FIG. 6) is increased, thus enhancing the fastening stability with respect to the cutting tool 200 (see FIG. 6). In particular, as shown in FIGS. 1 and 4, the straight line section 163 of the cutting insert 100 according to the present disclosure outwardly protrudes relative to the first and second concave sections 161 and 162 so that the contact area is increased as much as the protruded section, thus resulting in enhanced fastening stability with respect to the cutting tool (200 in FIG. 6). However, according to the conventional technology, as shown in FIG. 8, the main cutting edge 32 of the cutting insert 10 is concaved in an approximately "V" shape when viewed from the upper surface 12 such that the contact area is reduced by the amount of the concaved depth and therefore, the fastening stability with respect to the cutting tool is deteriorated in comparison with the present disclosure.

Hereinafter, referring to FIGS. 1 to 4 again, the corner cutting edge 170 will be described in more detail.

As shown in FIGS. 1 and 4, the corner cutting edge 170 may be connected to the short cutting edge 150 in a concave shape continuously from the concave sections 161 and 162 of the long cutting edge 160, when viewed from the long lateral surface 130. Thus, the edge strength of the corner cutting edge 170 can be enhanced through the corner cutting edge 170 in the concave shape, and the cutting load of the corner cutting edge 170 can be reduced through the corner cutting edge 170 of the concave shape, which results in reduced cutting resistance with respect to the workpiece during pocket cutting for cutting grooves and so on.

Particularly, as shown in FIG. 4, the corner cutting edge 170 may be curved with the same radius of curvature as the concave sections 161 and 162 of the long cutting edge 160 described above. Therefore, management of dimensions of the corner cutting edge 170 can be facilitated.

Hereinafter, referring to FIGS. 1, 3 and 5 again, the short lateral surface 120 will be described in more detail.

The short lateral surfaces (major lateral surface) 120 may include a first clearance surface (primary clearance surface) 121 adjacent the major surface 111, as shown in FIGS. 1, 3 and 5. In this example, as shown in FIG. 5, the first clearance surface 121 may form an obtuse angle $\theta 11$ with respect to the major surface 111. Thus, since the first clearance surfaces 121 adjacent the short cutting edge 150 form an obtuse angle $\theta 11$ with respect to the major surface 111, an amount of a body of the short cutting edge 150 is increased, and the strength of the short cutting edge 150 is increased.

Furthermore, as shown in FIGS. 1, 3 and 5, the short lateral surfaces (major lateral surfaces) 120 may each further include a second clearance surface (secondary clearance surface) 122 connecting the first clearance surface 121 and the minor surface 112. In this example, the second clearance surface 122 forms a right angle $\theta 12$ with respect to the major surface 111 and the minor surface 112, and may have a generally flat shape. Accordingly, when the cutting insert is fastened to the cutting tool 200 (see FIG. 6), the contact area with the second seat surface 202 (see FIG. 6) of the cutting tool 200 (see FIG. 6) is increased, thereby enhancing the fastening stability with respect to the cutting tool 200 (see FIG. 6).

Further, as shown in FIG. 3, the first clearance surface 121 may have a shape in which a width in a direction from the major surface 111 to the minor surface 112 increases gradually from the center thereof toward the respective long lateral surfaces 130.

Hereinafter, a cutting tool 200 according to an embodiment of the present disclosure will be described in detail with reference to FIG. 6.

FIG. 6 is a perspective view schematically showing a cutting tool equipped with the single-sided high feed cutting insert of FIG. 1.

The cutting tool 200 according to an embodiment of the present disclosure is a type of cutting tool that is equipped with the single-sided high feed cutting insert 100 according to the embodiment of the present disclosure described above, in which the cutting tool includes, provided in the pocket portion, the first seat surface 201, the second seat surface 202, and the third seat surface 203.

The first seat surface 201 is where the minor surface 112 of the single-sided high feed cutting insert 100 according to the present disclosure described above is placed, the second seat surface 202 is where the short lateral surfaces 120 of the single-sided high feed cutting insert 100 according to the present disclosure described above are placed, and the third seat surface 203 is where the long lateral surface 130 of the single-sided high feed cutting insert 100 according to the present disclosure described above are placed.

In particular, the third seat surface 203 may be inclined at a second angle $\theta 2$ in a direction gradually away from the center C1 of the cutting tool 200 in a direction toward the bottom surface 204 of the cutting tool 200. Therefore, when the single-sided high feed cutting insert 100 according to the embodiment of the present disclosure is mounted on the third seat surface 203 of the cutting tool of the present disclosure, a back taper is formed as much as the second angle $\theta 2$, thus reducing the interference with the workpiece during the pocket cutting.

Hereinafter, a single-sided high feed cutting insert 300 according to another embodiment of the present disclosure will be described in detail with reference to FIG. 7.

Figure 7:
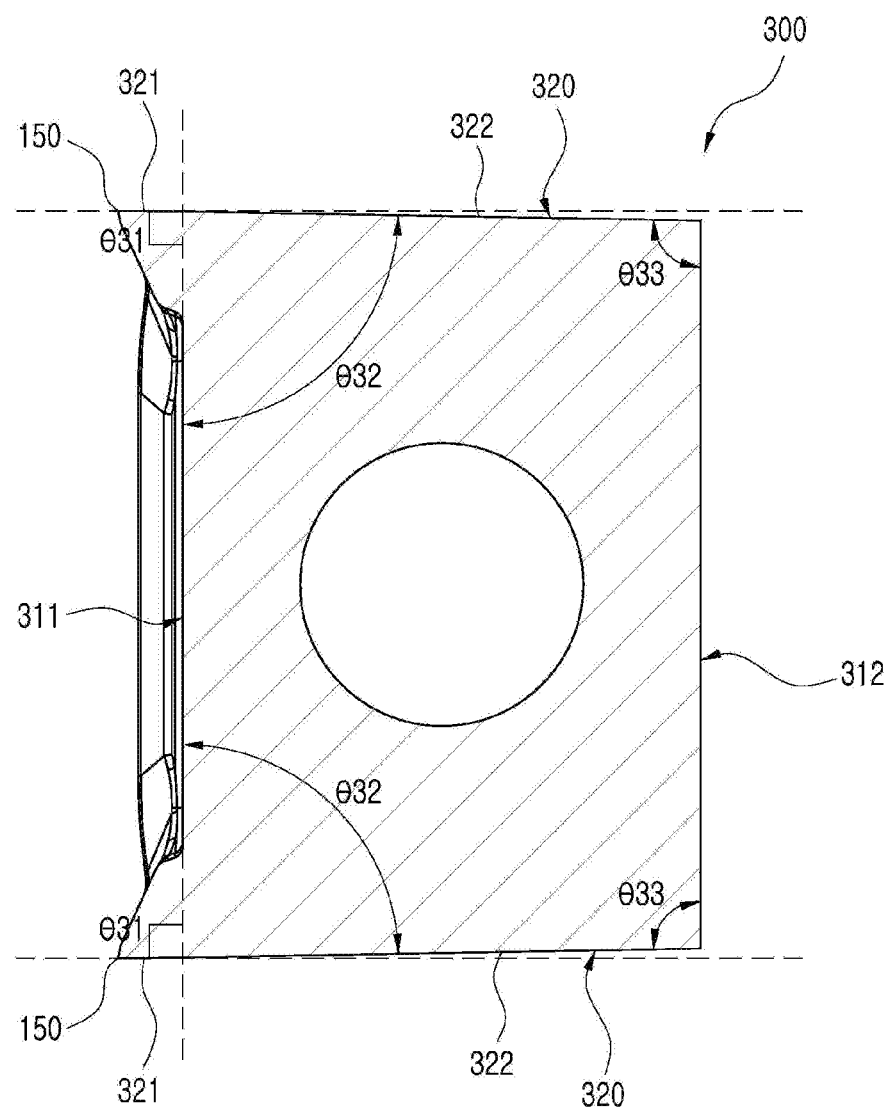
FIG. 7 is a cross-sectional view of a main part, schematically showing a single-sided high feed cutting insert according to another embodiment of the present disclosure.

FIG. 7 is a cross-sectional view of a main part, schematically showing a single-sided high feed cutting insert according to another embodiment of the present disclosure.

As shown in FIG. 7, the single-sided high feed cutting insert 300 according to another embodiment of the present disclosure is the same as the embodiment of the present disclosure described above except that the angle between the short lateral surface 320 and the major surface 311 and the angle between the short lateral surface 320 and the minor surface 312 are different, and these differences in angles will be mainly described below.

The short lateral surface 320 may include a first clearance surface 321 and a second clearance surface 322 adjacent the major surface 311, as shown in FIG. 7. In this example, the first clearance surface 321 is adjacent the major surface 311 and may form a right angle $\theta 31$ with respect to the major surface 311, and the second clearance surface 322 may connect the first clearance surface 321 and the minor surface 312, may form an acute angle $\theta 32$ with respect to the major surface 311 and an obtuse angle $\theta 33$ with respect to the minor surface 312, and may have a generally flat shape. Accordingly, when fastened with the cutting tool (see 200 in FIG. 6), the presence of the second clearance surface 322 increases a contact area with the second seat surface (see 202 in FIG. 6) of the cutting tool (see 200 in FIG. 6), while the second clearance surface 322, which may be fastened to the second seat surface 202 in the form of a wedge, can enhance the fastening stability with respect to the cutting tool (see 200 in FIG. 6).

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure relates to a single-sided high feed cutting insert and a cutting tool equipped with the same, and may be applied to cutting a workpiece, which is industrially applicable.

What is claimed is:

1. A single-sided high feed cutting insert comprising:
a major surface and a minor surface facing each other in opposite directions; two short lateral surfaces which connect between the major surface and the minor surface and which face each other in opposite directions; two long lateral surfaces which connect between the major surface and the minor surface and between the two short lateral surfaces, which face each other in opposite directions, and which have a width greater than a width of the short lateral surfaces; and a fastening hole extending through the two long lateral surfaces to receive a cutting tool fastening bolt inserted therein, and comprising:

short cutting edges provided on boundary portions between the major surface and each of the short lateral surfaces;

long cutting edges provided on boundary portions between the major surface and each of the long lateral surfaces, and corner cutting edges that connect between the short cutting edges and the long cutting edges, wherein the short cutting edges each has an outwardly convex curved shape when viewed from the major surface, and the minor surface has a straight shape when viewed from each of the short and long lateral surfaces, respectively, and wherein each of the long cutting edges includes:

first and second concave sections that are inwardly concave when viewed from either of the two long lateral surfaces; and a straight line section that connects the first and second concave sections.

2. The single-sided high feed cutting insert of claim 1, wherein the short cutting edges each has an outwardly convex curved shape when viewed from the short lateral surface.

3. The single-sided high feed cutting insert of claim 1, wherein each of the first and second concave sections starts from each of the corner cutting edges and ends at the straight line section, when viewed from either of the two long lateral surfaces.

4. The single-sided high feed cutting insert of claim 3, wherein each of the corner cutting edges is connected to each of the short cutting edges in a concave shape continuously from the first and second concave sections, respectively, when viewed from either of the two long lateral surfaces.

5. The single-sided high feed cutting insert of claim 3, wherein each of the long cutting edges has a symmetrical shape with respect to a center of the straight line section.

6. The single-sided high feed cutting insert of claim 3, wherein the straight line section protrudes outwardly relative to the first and second concave sections.

7. The single-sided high feed cutting insert of claim 1, wherein each of the short lateral surfaces includes a first clearance surface adjacent to each of the short cutting edges, wherein the first clearance surface forms an obtuse angle with respect to the major surface.

8. The single-sided high feed cutting insert of claim 7, wherein each of the short lateral surfaces further include a second clearance surface connecting the first clearance surface and the minor surface, wherein the second clearance surface forms a right angle with respect to the major surface and the minor surface, respectively, and has a generally flat shape.

9. The single-sided high feed cutting insert of claim 8, wherein the first clearance surface has a shape in which a width in a direction from the major surface to the minor surface increases gradually from a center toward the respective long lateral surfaces.

10. The single-sided high feed cutting insert of claim 1, wherein each of the short lateral surfaces includes a first clearance surface adjacent to each of the short cutting edges and a second clearance surface connecting the first clearance surface and the minor surface, wherein the first clearance surface forms a right angle with respect to the major surface, and wherein the second clearance surface forms an acute angle with respect to the major surface, forms an obtuse angle with respect to the minor surface, and has a generally flat shape.

11. The single-sided high feed cutting insert of claim 1, wherein the major surface is horizontally symmetrical, vertically symmetrical, and rotationally symmetrical by 180 degrees with respect to a center thereof.

12. The single-sided high feed cutting insert of claim 1, wherein, when viewed from the major surface, centers of the short cutting edges protrude further than any other portion of the short cutting edges.

13. The single-sided high feed cutting insert of claim 2, wherein, when viewed from either of the two short lateral surfaces, centers of the short cutting edges protrude further than any other portion of the short cutting edges.

14. A cutting tool equipped with the single-sided high feed cutting insert of claim 1, the cutting tool comprising:

a first seat surface on which the minor surface is placed;

a second seat surface on which the short lateral surfaces are placed; and a third seat surface on which the long lateral surfaces are placed, wherein the third seat surface is inclined gradually away from a center of the cutting tool in a direction toward a bottom surface of the cutting tool.

* * * * *